(12) United States Patent
Meister (10) Patent No.: US 9,378,487 B2
(45) Date of Patent: Jun. 28, 2016

(54) OUTBOUND BLACKLIST AND ALERT FOR PREVENTING INADVERTENT TRANSMISSION OF EMAIL TO AN UNINTENDED RECIPIENT

(76) Inventor: Mark Meister, Potomac, MD (US)

(*) Notice: Subject to any disclaimer, the term of this patent is extended or adjusted under 35 U.S.C. 154(b) by 88 days.

(21) Appl. No.: 13/267,318

(22) Filed: Oct. 6, 2011

(65) Prior Publication Data

US 2012/0089686 A1 Apr. 12, 2012

Related U.S. Application Data (60) Provisional application No. 61/391,358, filed on Oct. 8, 2010.

(51) Int. Cl.
| | |
|---|---|
| *G06F 15/16* | (2006.01) |
| *G06Q 10/10* | (2012.01) |
| *H04L 12/58* | (2006.01) |
| *H04L 29/08* | (2006.01) |

(52) U.S. Cl.
CPC ............ *G06Q 10/107* (2013.01); *H04L 12/585* (2013.01); *H04L 29/08072* (2013.01); *H04L 51/12* (2013.01)

(58) Field of Classification Search
CPC ........... G06Q 10/107; H04L 29/08072; H04L 12/585
USPC .................................. 709/203–207; 715/808
See application file for complete search history.

(56) References Cited

U.S. PATENT DOCUMENTS

| | | | |
|---|---|---|---|
| 9,306,887 B1 | 4/2016 | Brunetti et al. | |
| 2004/0103162 A1* | 5/2004 | Meister et al. | 709/206 |
| 2009/0287778 A1* | 11/2009 | MacLellan et al. | 709/206 |
| 2010/0095377 A1* | 4/2010 | Krywaniuk | 726/22 |
| 2010/0115123 A1* | 5/2010 | Airamo | 709/234 |
| 2010/0130162 A1* | 5/2010 | Yang | 455/406 |
| 2010/0189231 A1* | 7/2010 | LaFreniere et al. | 379/93.01 |
| 2010/0274860 A1* | 10/2010 | Hirota et al. | 709/206 |
| 2010/0318836 A1* | 12/2010 | Ness et al. | 714/4 |
| 2011/0055334 A1* | 3/2011 | Tivyan | H04L 51/30 709/206 |
| 2011/0078550 A1* | 3/2011 | Nabutovsky | 715/206 |
| 2011/0119730 A1* | 5/2011 | Eldar | G06F 21/554 726/1 |
| 2011/0154181 A1* | 6/2011 | Kawa et al. | 715/234 |
| 2012/0011361 A1* | 1/2012 | Guerrero et al. | 713/168 |
| 2012/0077467 A1* | 3/2012 | Fan et al. | 455/414.1 |

FOREIGN PATENT DOCUMENTS

EP 1768056 A1 * 3/2007

OTHER PUBLICATIONS http://service.meltwaternews.com/mnews/redirect.html?docId=7366915&userId=2982733&cId=128894&pId=11&agentId=178656&type=3&etype=USER_CREATED&t=And+The+US+Patent+Goes+To+%E2%80%A6+Kevin+Spacey&cdt=1463403000000&sn=Law360&cc=United+States&surl=&an=Clicked+from+Archive%2C+Newsfeed%2C+or+Newsletter&ue=ryan.elliott@uspto.gov&url=, Date: May 16, 2016.

* cited by examiner

*Primary Examiner* — Chris Parry
*Assistant Examiner* — Weiwei Stiltner
(74) *Attorney, Agent, or Firm* — Staas & Halsey LLP (57) ABSTRACT

A system and method provide an alert when identifying destination data designated for a recipient of a message meets a predefined condition and prompt a sender of the message for an input regarding the destination data when determining that the destination data meets the predefined condition. The sender is enabled to approve or disapprove the sending of the message using the destination data or revise the same. The destination data may be all or part of an address of the recipient previously identified and stored by the sender or a system.

4 Claims, 8 Drawing Sheets

| Contact | Email Address or Domain | |
|---|---|---|
| John Doe | jd@gmail.net | |
| Lovergirl | janesmith@aol.com | |
| Sue Happy | shappy@wesueyou.com | |
| Dewey, Cheatem, & Howe, PC | | dch.com |
| Bill Blake | bblake@rivalcorp.com | |
| Cross Town Competition | | ctcomp.net |

000000# OUTBOUND BLACKLIST AND ALERT FOR PREVENTING INADVERTENT TRANSMISSION OF EMAIL TO AN UNINTENDED RECIPIENT

CROSS-REFERENCE TO RELATED APPLICATION

This application is related to and claims the benefit of U.S. Application Ser. No. 61/391,358, filed Oct. 8, 2010, inventor Mark Meister, titled OUTBOUND BLACKLIST AND ALERT FOR PREVENTING INADVERTANT TRANSMISSION OF EMAIL TO AN UNINTENDED RECIPIENT, in the United States Patent and Trademark Office, the disclosure of which is incorporated herein by reference.

BACKGROUND

1. Field

Various embodiments discussed herein relate to a method and system of processing destination data of a message prior to transmission of the message.

2. Description of the Related Art

It is not uncommon that an electronic message (e.g., email) is misaddressed in haste or simply as the result of an oversight. In that event, personal, proprietary, or simply embarrassing information can and does fall into the wrong hands, e.g., a business competitor, the opposing party in a legal proceeding, or a spouse in the case of an extramarital affair, with attendant negative moral, social, or economic consequences. What is needed is the insertion of a check and alert step in the process of creating and transmitting electronic messages in order to prevent inadvertent transmission of sensitive or personal information.

The use of an "outbound blacklist" is one method that could be implemented to help prevent the inadvertent transmission of sensitive information to a known but unintended recipient. A "blacklist", in the context of a received email (i.e., as messages exchanged between senders and receivers via the internet are commonly known), generally refers to a list of email senders (or their internet domains) that is maintained by email recipients. It is used by "spam" or "junkmail" filters to divert undesired incoming email to spam or junkmail "folders" on an email server or on the recipient's computer. For example, a user who knows he doesn't want to be bothered with advertising for X could blacklist email from Y to block or divert that email. In this case, a blacklist has been used to block the reception of unwanted email.

Although various blacklisting techniques are available for filtering a received email that has been sent from a source, there is a need for a tool for preventing inadvertent transmission of messages.

SUMMARY

It is an aspect of the embodiments discussed herein to provide a system and method enabled to determine whether destination data designated for a message meets a predefined condition and prompt a sender of the message for an input regarding the destination data when said determining indicates the destination data meets the predefined condition.

These together with other aspects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

To overcome drawbacks of the above discussed typical technologies and similar others, the disclosed system and method provide a tool for determining and verifying whether a message should be transmitted.

In order to ensure that information isn't transmitted to an unintended recipient, a blacklist could be used in the reverse, or prior to transmission. Specifically, before an email leaves the sender's computer or the sender's email server, a recipient address is checked against the sender's reverse or outbound blacklist. If destination data of a recipient such as the recipient's email address or internet domain appears on the sender's outgoing blacklist, the sender is alerted and asked to confirm whether the sender would like the transmission to continue. Transmitting or sending of a message as referred herein includes transmission of a message of any type from one computer to another or transferring a message within a computer (i.e., from one application to another).

Figure 1:
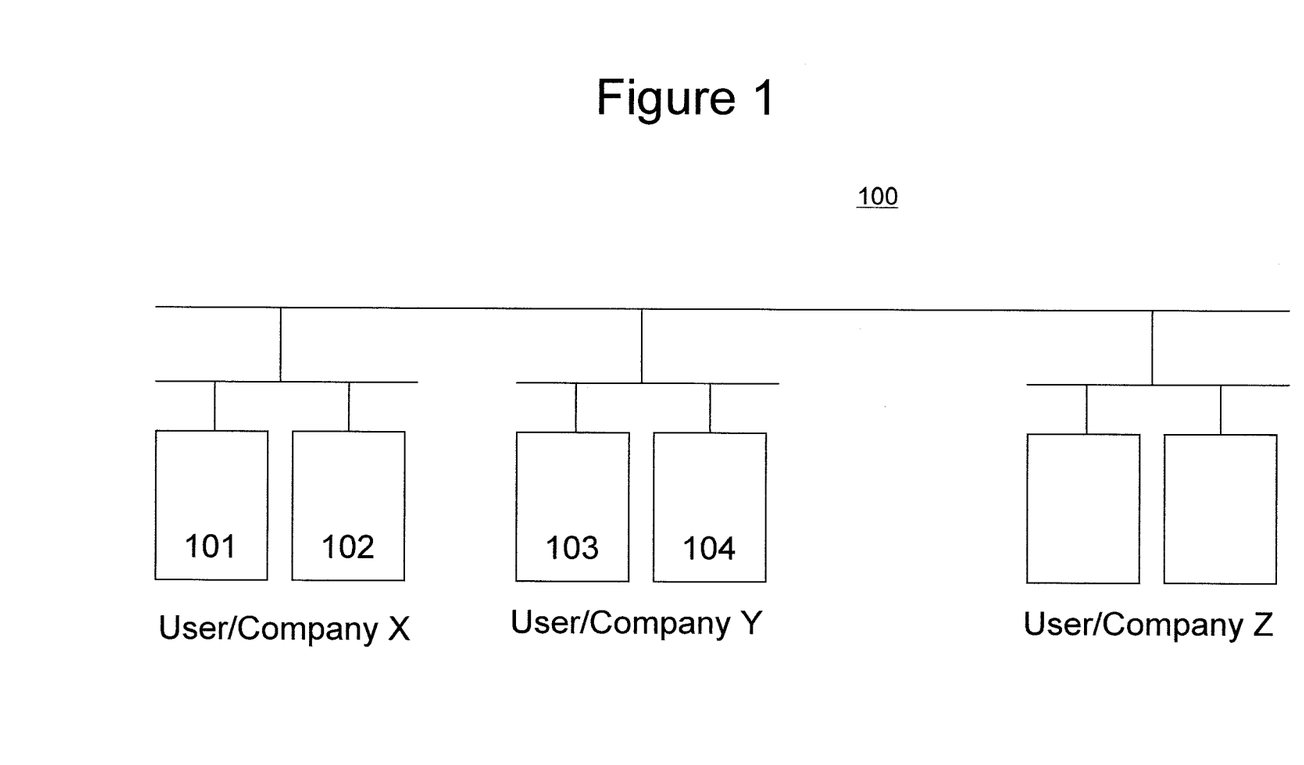
FIG. 1 illustrates an exemplary computer network useable to transmit and receive a message.

FIG. 1 shows an embodiment of a computer network 100 useable to transmit and receive a message, such as an email. As shown in FIG. 1, the computer network 100 includes a sender's computer 101, a recipient's computer 103, and respective email servers 102 and 104. FIG. 1 shows that the sender's computer 101 is associated with user or company X and the recipient's computer 103 is associated with user or company Y. There may also be computers associated with additional user(s) or company Z. While FIG. 1 shows a particular number of sender's and recipient's computers and particular type of servers thereof, the present invention is not limited to any particular number or type of device. For example, any device, system or server used to exchange messages between a source and a destination may be used. Any of the computer systems described herein may be a typical computer system, a handheld device including a telephone, PDA, a specialized query terminal, or any other source or destination that allows a user to send and/or receive messages.

Further, while FIG. 1 shows a sender of one company (company X) and a recipient of another company (company Y), the present invention is not limited to sender and recipients of different companies, nor is it necessary that senders and/or receivers be affiliated with any company(ies) at all. For example, an address of a recipient who is associated with the same company as that of a sender may be designated to trigger a prompt when the sender identifies the address of the recipient. Similarly, a sender and a recipient may be users or systems in the same network or in different networks.

Figure 2:
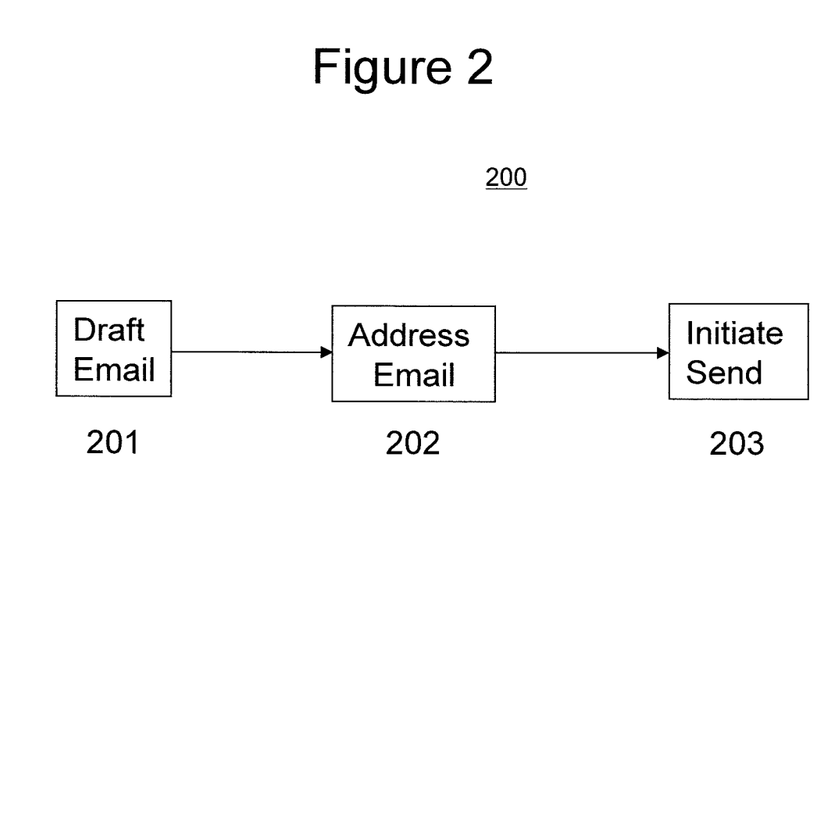
FIG. 2 an exemplary diagram of an operation in a preparation leading up to transmission of an email.

FIG. 2 shows an embodiment of a process 200 leading up to transmission of an email. As shown in FIG. 2, process 200 begins by a sender drafting 201 the email. According to process 200, a sender such may be considered to be drafting 201 an email when the sender accesses an email tool or function including but not limited to when the sender requests creation of a new email, selects a reply or forward function in association with an email received, etc.

After the sender drafting 201 the email, process 200 moves to addressing 202 the email. For example, when a user drafts an email, the user may be prompted to enter an address to which the email is to be sent. Subsequent to addressing 202 the email, the process 200 moves to initiating 203 send.

When an email user wishes to send an email to user such as a colleague, friend, or other recipient, the process 200 often begins with the sender drafting 201 (see FIG. 2) and addressing 202 the message using an email software application, for example, on the sender's computer 101. Once the message is complete and addressed, the sender initiates its transmission by "pressing" a send button 203 within the sender's email application. From there, email servers, for example, 102 and 104 (FIG. 1) handle the exchange of email from sender to receiver.

While the process 200 shows addressing an email as occurring prior to initiation of sending, the present invention is not limited to a particular order of events. For example, prior to drafting an email, a sender may input a desired email address to determine whether the address would trigger a check and confirm operation described in detail below with respect to FIG. 3.

Figure 3:
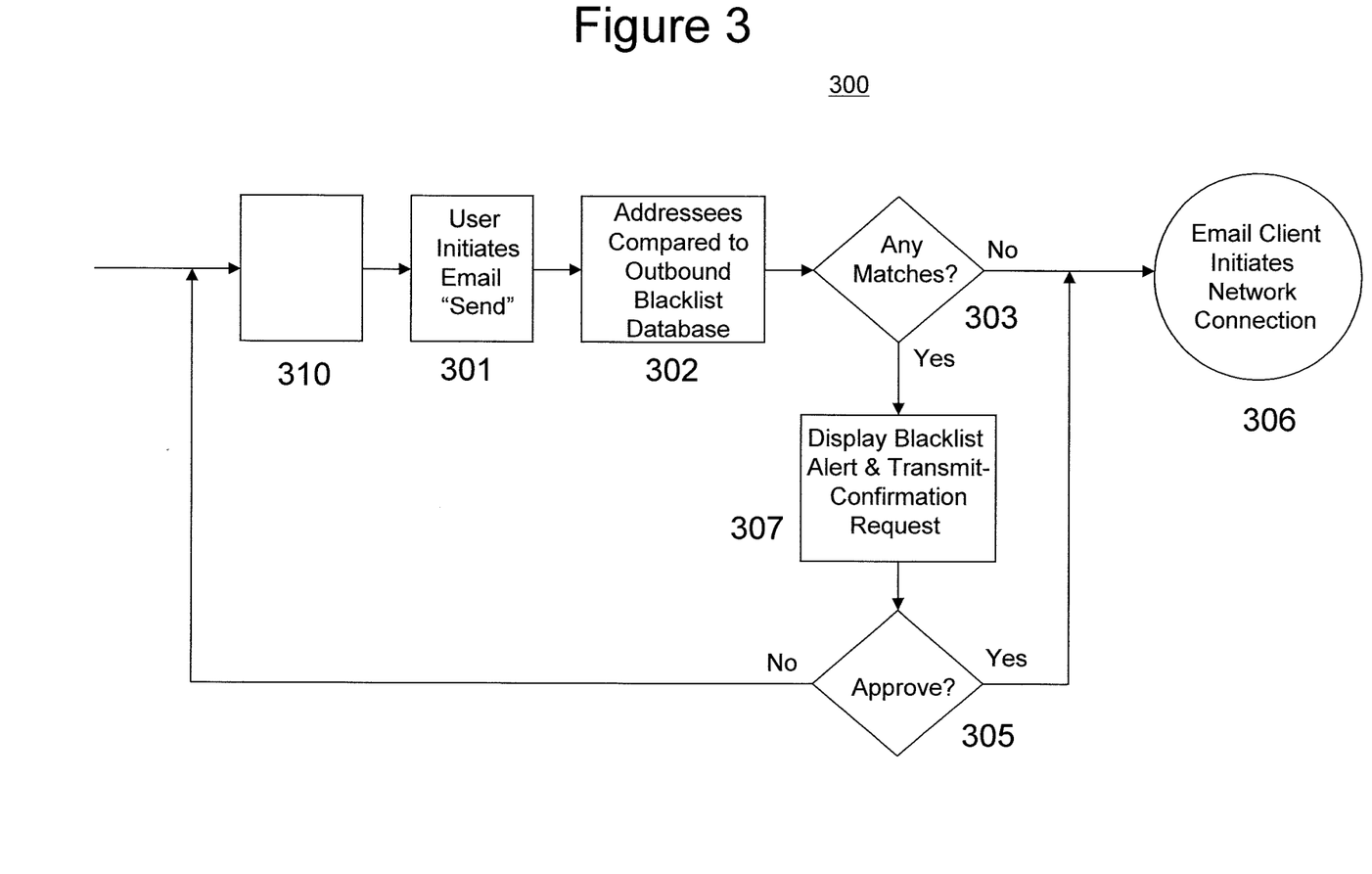
FIG. 3 illustrates a flow diagram of a check and confirm process.

FIG. 3 shows an exemplary check and confirm process 300. As shown in FIG. 3, process 300 begins by a user initiating an email send 301. As illustrated in FIG. 3 by the blank box 310, the email send 301 operation usually follows other related email preparation functions or operations.

After the initiation of the email send 301, process 300 moves to comparing 302 address(es) to an outbound backlist database. For example, an address indicated in association with a message may be compared with a stored address that may be maintained locally or remotely. A detailed description of an exemplary outbound blacklist database is provided in FIG. 4.

Subsequent to the comparing 302, the process 300 moves to determining 303 whether a match exists. When the determining 303 indicates that a match exists, the process 300 moves to displaying blacklist alert and transmit confirm request 307. On the other hand, when the determining 303 indicates that a match does not exist, an email client initiates network connection 306 to continue the transmission process.

After displaying the blacklist alert and transmit confirm request 307, process 300 awaits 305 user input to indicate either approval to continue to transmit the message, or to cancel its transmission. When the determination of approval 305 indicates disapproval, process 300 returns control and waits for next request for initiation of an email send. If the user approves transmission at 305, process 300 continues with transmission, for example by 306 initiating a network connection. Otherwise, if the user wishes to cancel or abort the transmission at 305, control is returned to the user allowing the user an opportunity to readdress, revise, delete, etc.

It can and does happen that email is errantly addressed and therefore ends up in the possession of an unintended recipient. To catch the unintended error and prevent the often undesirable consequences, operations 302, 303, 404 and 305 of FIG. 3 can, by way of example, be inserted in the process. After the sender "presses" the "send" button to thereby initiate the email send 301 and before a client email application may make a network connection 306 to its email server 102, for example, the system 100 detects the send button activation and compares 303 the addressee(s) to the user's outbound blacklist database (e.g. FIG. 4). The outbound blacklist is one that the user maintains with specific email addresses or domain names for which the user would like to be alerted before sending email to.

Figure 4:
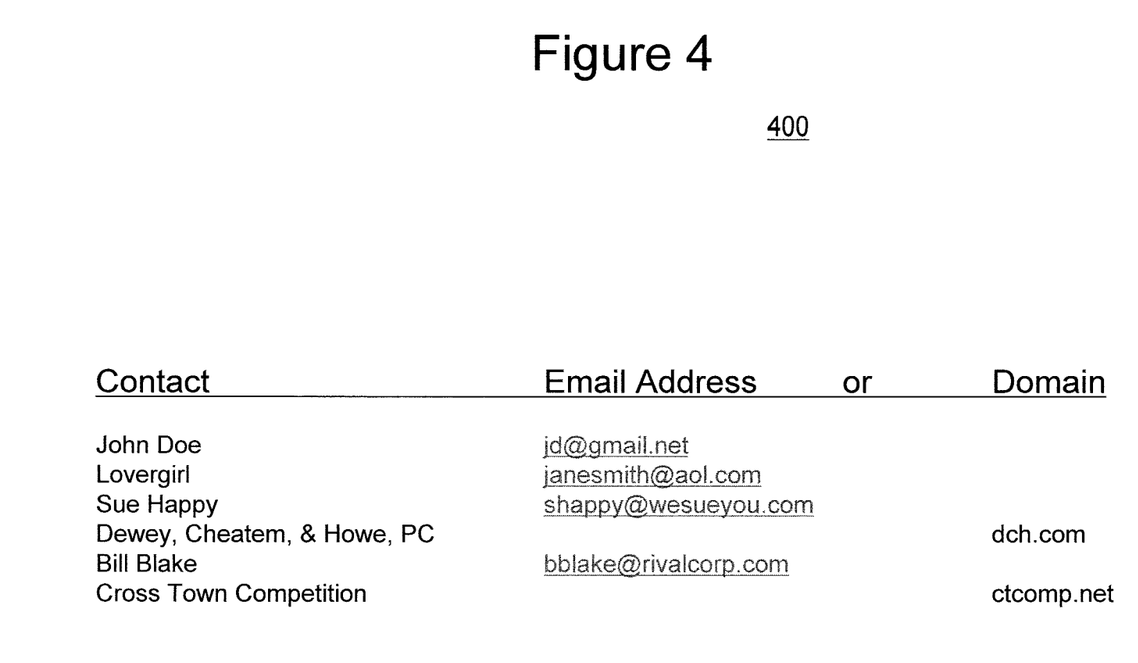
FIG. 4 illustrates exemplary entries in a blacklist database.

FIG. 4 illustrates exemplary entries in a blacklist database 400. As shown in FIG. 4, the blacklist database 400 may include contact information, email address or domain information, etc. While few elements are described as being contained in the blacklist database, the present invention is not limited to any particular items. For example, any identifier of a destination such as a company name, certain characters such as a number or particular words, etc., associated with the destination may be included in the blacklist database. The system 100 (FIG. 1) may be configured to provide a prompt (alert or notification) 501 (FIG. 5) when a sender indicates a destination containing a particular word, for example ".gov" as part of a recipient address of a message to be sent by the sender. When the user addresses a message using an address, name, or domain, etc., that appears in the blacklist database 400, the sender would need to confirm the desire to send to that destination prior to the message being sent.

According to an embodiment, the blacklist database shown in FIG. 4 may also include commonly mistaken destination data in correspondence with a correct version of the destination data. When a sender identifies the commonly mistaken destination data as pre-stored in the blacklist database, the sender may be prompted to confirm the destination data including using an alert 501 explained in detail below with reference to FIG. 5. For example, if a sender indicates "**@gmail.con" and "**@gmail.con" has been stored in the blacklist database, the system 100 (FIG. 1) may be configured to provide the alert 501 shown in FIG. 5.

Figure 5:
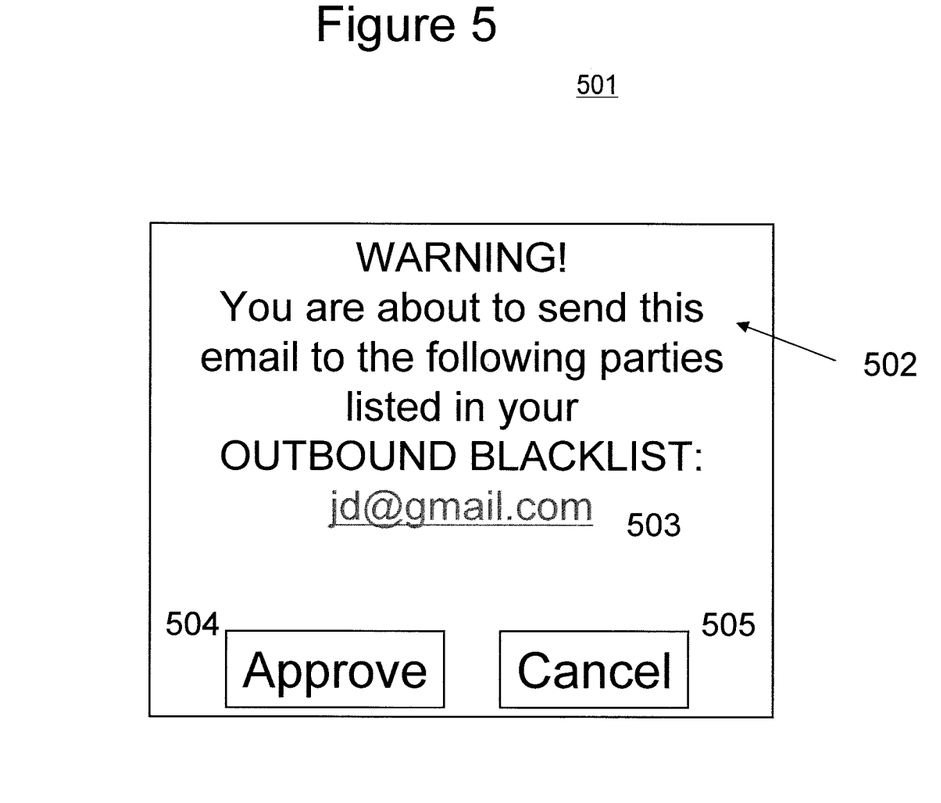
FIG. 5 illustrates an alert provided to an email sender.

FIG. 5 shows an alert 501 provided to an email sender. As shown in FIG. 5, the alert or prompt 501 may include descriptive content 502, an identifier of a recipient 503, an approve button 504 and a cancel button 505. The alert 501 may be provided as a "Confirmation Request" to an email sender in order to prevent inadvertent transmission to an unintended recipient.

In the event that any of the addressees is listed in the database, the application displays a "Confirmation Request" in the form of an alert 501 on a display of the sender's computer 101 (FIG. 1). The alert warns the sender that the sender is about to send an email to a outbound-blacklist listed recipient. As shown in FIG. 5, the alert 501 includes provides the content 502, displays the addressee's email address as the identifier 503 and requests that the sender either "approve" using the approve button 504 the transmission, in which case the application makes the connection 306 (FIG. 3) to the email server 102 to continue the transmission sequence, or "cancel" using the cancel button 505 the transmission and return the sender to any of the email drafting steps coming before 310 the send button is activated 301. This, for example, will allow the user to revise the message including destination thereof, as needed.

Figure 6:
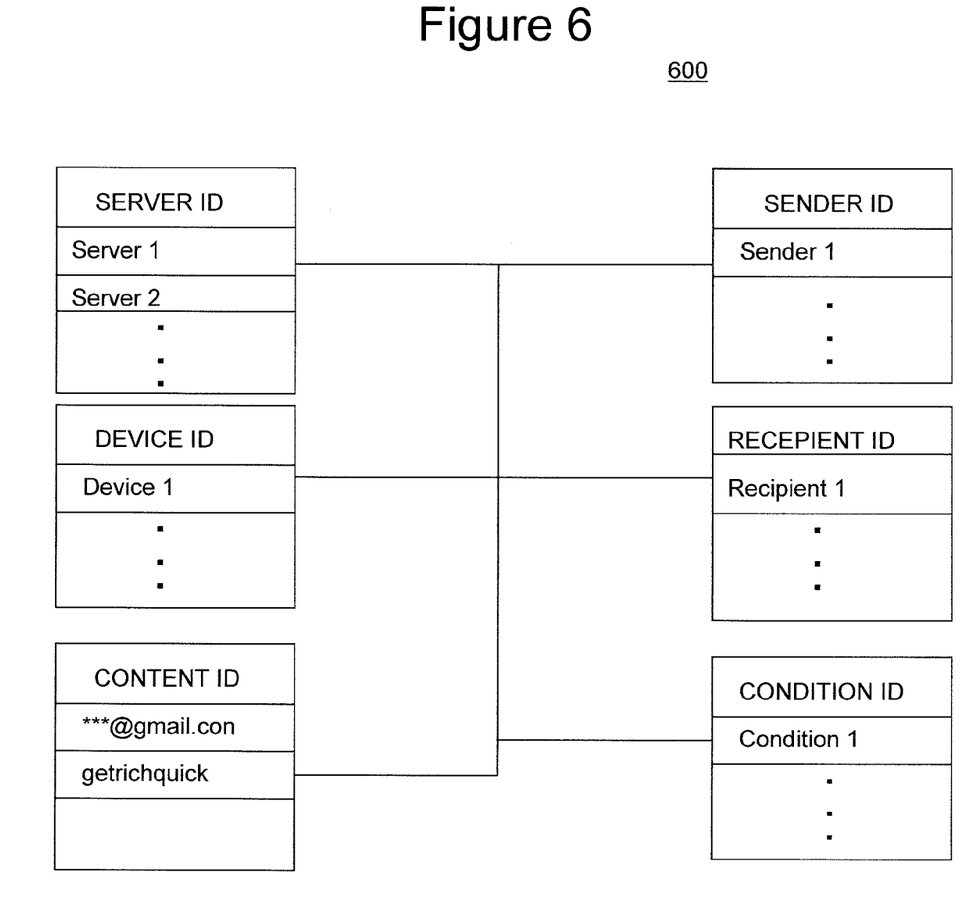
FIG. 6 illustrates a relationship diagram for confirming a destination data for a recipient of a message.

FIG. 6 illustrates a relationship database 600 for confirming a destination data of a recipient of a message. As shown in FIG. 6, data structures are provided for one or more servers, senders, recipients, devices, conditions and content. For example, content listed in the database 600 may be caused to trigger an alert 501 (FIG. 5) when the content is designated as a designation for a message being drafted by sender. The content information is also associated with servers, senders, recipients, devices, conditions, and vice versa. The relationship database 600 thus enables a link between servers, senders, recipients, devices, conditions and content such that any of the stored elements can be specified to cause the alert 501 (FIG. 5) to be displayed. For example, when a sender provides an identifier of a server as part of a destination for a message and that server is stored in the database 600, the sender is presented with the alert 501 (FIG. 5).

Figure 7:
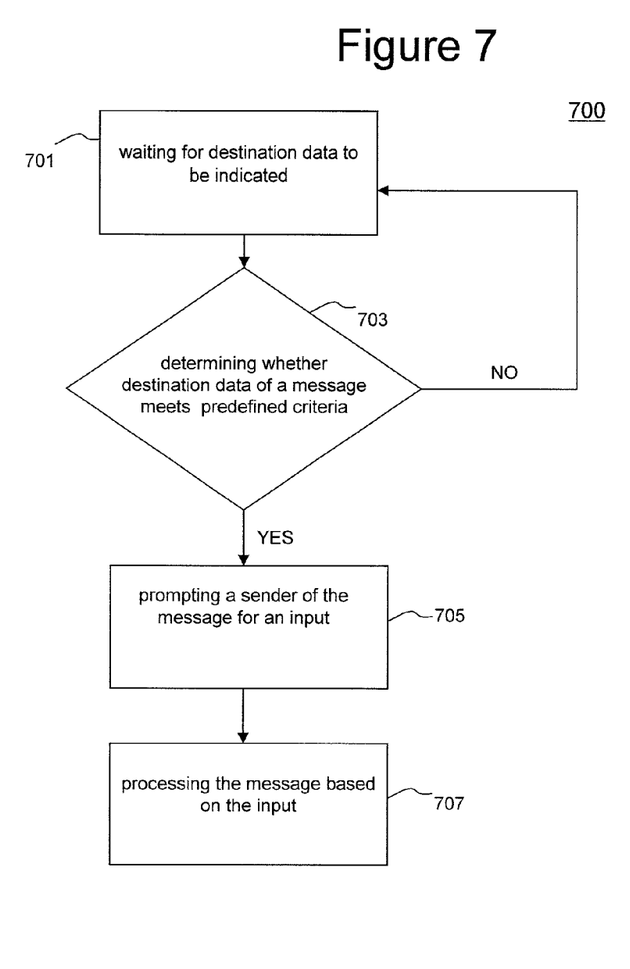
FIG. 7 a flow diagram for determining whether a destination data designated for a message meets a predefined condition.

FIG. 7 shows a process 700 for determining whether destination data designated for a message meets a predefined condition. As shown in FIG. 7, process 700 waits 701 for destination data to be indicated. According to an embodiment, destination data of a message may be designated automatically or manually by a sender. Subsequent to waiting 701, process 700 moves to determining 703 whether destination data of a message meets a predetermined criteria or condition. For example, a determination may be made to check whether destination data of a message contains an address or any other identifier stored in the database 600 (FIG. 6).

After determining 703, process 700 continues by prompting 705 a sender of the message for an input. The prompting 705 may include providing the sender with the alert 501 (FIG. 5) such that the sender is able to specify approval or disapproval regarding transmission of the message.

Subsequent to the prompting 705, process 700 moves to processing 707 the message based on the input. Using the same example, the message may be transmitted or not based on the sender's input (i.e., approval or disapproval). In the case that the input indicates that the sender does not approve, then the sender may be provided with an option to revise the message and information association therewith.

Figure 8:
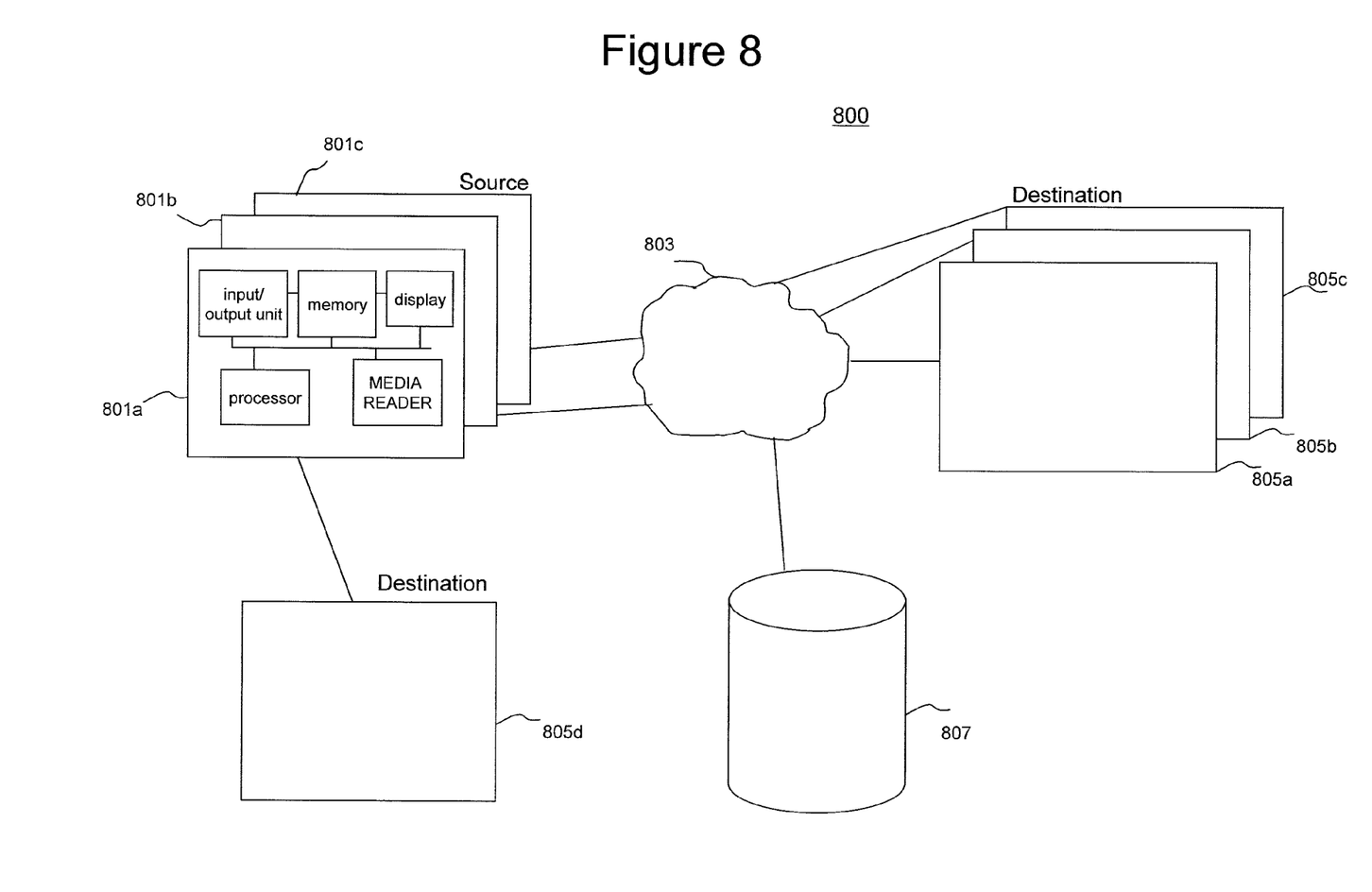
FIG. 8 is an exemplary system for determining whether a message should be transmitted to a destination prior to initial transmission of the message.

FIG. 8 is an exemplary system 800 for determining whether a message should be transmitted to a destination prior to constructive transmission of the message. The system 800 includes sources 801, destinations 805, database 807 communicatively coupled via a network 803. Any of the sources 801 may indicate a destination relative to any of the destinations 805 which then may trigger the system 800 to prompt the sources 801 to confirm the destination data prior to transmission based on information maintained in the database 807. Although one network (803) is shown in FIG. 8, the present invention is not limited to any particular number and type of networks. For example, the system 800 may be a global public network such as the Internet or consist in whole or in part of one or more private networks, or one computer.

The embodiments have been described with respect to processing a message including identifying a destination of a message that meets predefined criteria or condition and prompting a sender of the message to confirm the destination prior to sending the message.

According to an embodiment, a method detects initiation of sending of an email message when a send function is selected, scans content of the message for destination data and determines whether the destination data is contained in a stored list, and alerts a sender of the message when the destination data is contained in the stored list, where the sender is alerted and enabled to approve the sending of the message by responding to the alert.

The embodiments can be implemented in computing hardware (computing apparatus) and/or software, such as (in a non-limiting example) any computer that can store, retrieve, process and/or output data and/or communicate with other computers or itself. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Although the embodiment(s) of the present invention(s) has(have) been described in detail, it should be understood that the various changes, substitutions, and alterations could be made hereto without departing from the spirit and scope of the invention, the scope of which is defined in the claims and their equivalents.

What is claimed is:

1. A system, comprising:
a source computer determining whether a destination designated for a message before a message text is created meets a predefined condition of being on a blacklist of destinations for which the message is to be intercepted before sending; and
a display provided to the source computer prompting a sender of the message for an input of one of approval and disapproval regarding the destination when said determining indicates the destination meets the predefined condition of being on the blacklist,
wherein the blacklist is a list of outbound email addresses to which sending of email can be prevented,
wherein the predefined condition is that the email message contains sensitive information.

2. The system according to claim 1, wherein said determining is executed prior to transmission of the message.

3. The system according to claim 2, comprising: a database storing the predefined condition in association with destination data prior to said determining.

4. The system according to claim 3, wherein an address in the destination data is compared with an address in an outbound blacklist database, and the sender is prompted for the input when the address matches content in the outbound blacklist database.

\* \* \* \* \*